US012104365B2

(12) United States Patent
Wu

(10) Patent No.: US 12,104,365 B2
(45) Date of Patent: Oct. 1, 2024

(54) WATER-REPLENISHING PIPE DREDGING DEVICE

(71) Applicant: Kuei-Kun Wu, Kaohsiung (TW)

(72) Inventor: Kuei-Kun Wu, Kaohsiung (TW)

( * ) Notice: Subject to any disclaimer, the term of this patent is extended or adjusted under 35 U.S.C. 154(b) by 69 days.

(21) Appl. No.: 18/072,208

(22) Filed: Nov. 30, 2022

(65) Prior Publication Data

US 2024/0175248 A1 May 30, 2024

(51) Int. Cl.
*E03C 1/308* (2006.01)
*B08B 9/032* (2006.01)

(52) U.S. Cl.
CPC ............ *E03C 1/308* (2013.01); *B08B 9/0321* (2013.01); *B08B 2209/032* (2013.01)

(58) Field of Classification Search
CPC ..... B08B 9/0321; B08B 9/0326; B08B 9/035; E03C 1/30–306; E03C 1/308; E03D 3/10; E03F 9/00; E03F 9/007
See application file for complete search history.

(56) References Cited

U.S. PATENT DOCUMENTS 5,403,166 A * 4/1995 Pingiotti ................. E03C 1/304 417/490
6,035,455 A * 3/2000 Rankovic ................ E03C 1/308 4/255.03
6,499,151 B1 * 12/2002 Ollinger ..................... E03D 9/00 4/255.02
7,073,211 B1 * 7/2006 Wu ......................... E03C 1/308 4/255.02
2019/0003168 A1 * 1/2019 Hennessy ............... E03C 1/308

FOREIGN PATENT DOCUMENTS

TW I292806 1/2008

* cited by examiner

*Primary Examiner* — David P Angwin
*Assistant Examiner* — Nicholas A Ros
(74) *Attorney, Agent, or Firm* — Muncy, Geissler, Olds & Lowe, P.C.

(57) ABSTRACT

The invention discloses a water-replenishing pipe dredging device, comprising a push-pull unit and a water replenishing unit. The push-pull unit comprises a main body pipe, a pulling part, and a suction part. The water replenishing unit comprises a water replenishing pipe, an upper cover group, and a lower cover group. When the pulling part is operated to pump water upward, the pulling part is pulled to a fixed position, and the remaining water will be injected into an extra space formed by upward movement of the pulling part in the main body pipe until a water level of the main body pipe is flush with that of the water replenishing pipe, so that the impact force of water in the main body pipe can be conveniently applied, can be completely transmitted to a blocked end, and can effectively clear blockages in a drainage pipeline.

9 Claims, 14 Drawing Sheets

WATER-REPLENISHING PIPE DREDGING DEVICE

FIELD OF THE INVENTION

The invention relates to a pipe dredging device, in particular to a water-replenishing pipe dredging device.

BACKGROUND OF THE INVENTION

In the market of dredging devices which is designed to use a gas pressure difference, due to compressibility of gas, the gas inside a disk body may be squeezed and then apply little pressure to residual water and blockages inside a pipeline. The problem that a drainage pipeline of a toilet is blocked and fails to drain water normally is hardly handled. Therefore, such dredging devices have poor effect in practice.

In view of this, the applicant designs a hydraulic pipe dredging device disclosed in Taiwan patent number TW 1292806, referring to FIG. 1 and FIG. 2. A piston 11 is arranged and a space 12 for accommodating water is reserved in a pipe body 10 of the hydraulic dredging device 1, and an impact disk 13 is arranged in the pipe body 10. The impact disk 13 is connected with a push pipe 14 and penetrates through a top end of the pipe body 10, and a force applying grip 15 is arranged at a top end of the push pipe 14. When the pipe is dredged, the water pre-accommodated in the pipe body 10 may be replenished and injected into a drainage pipeline of a toilet first, so that a space between the drainage pipe and the pipe body 10 of the hydraulic dredging device 1 is filled with water. When the impact force formed by slapping or pushing the force applying grip 15 directly impacts or pushes the piston 11 through the impact disk 13 and then pushes the water inside the pipe body 10 by means of the piston 11, the impact force may be transmitted to the drainage pipeline to push the blockages.

However, when the force applying grip 15 is slapped or pushed, the piston 11 in the pipe body 10 is not fully airtight, and a part of air still remains in the pipe body 10, so that the water between the drainage pipeline and the pipe body 10 of the hydraulic dredging device 1 is not completely full, and the water may be pressured out only after the part of air in the pipe body 10 is pressed out. Therefore, the pressure of pressing out the water is insufficient; and the blockages in drainage pipeline are unable to be smoothly pressurized and dredged. The hydraulic dredging device 1 will further be improved due to the above defects.

SUMMARY OF THE INVENTION

A major objective of the invention is to solve a problem of insufficient pressure for pressing out water due to the fact that a piston in a pipe body of a conventional hydraulic pipe dredging device is not fully airtight, a part of air remains in the pipe body, and the pipe body is not completely filled with water.

To achieve the above objective, the invention provides a water-replenishing pipe dredging device, comprising a push-pull unit, comprising a main body pipe, a pulling part connected with a first end of the main body pipe and configured to extend and retract inside an interior of the main body pipe, and a suction part connected with a second end of the main body pipe, the second end of the main body pipe being opposite to the end of the main body to which the pulling part is connected, wherein the pulling part comprises a straight pipe body penetrating into the main body pipe, a handle arranged on an upper part of the straight pipe body and provided to drive the straight pipe body to move inside the main body pipe, a push piece arranged on a lower part of the straight pipe body, a grip cover arranged on an upper part of the main body pipe and provided for the straight pipe body to penetrate, a piston arranged inside a lower part of the main body pipe, a pull rod penetrating into the straight pipe body and the piston, and a compression spring sleeved outside the pull rod and abutted between the push piece and the piston; and wherein the grip cover comprises an accommodating space formed at a bottom of the grip cover and provided with a downward opening, and a first buckle formed on one side of an outer periphery of the grip cover, the accommodating space is sleeved on the upper part of the main body pipe, and wherein the compression spring is configured to be extended and compressed between the push piece and the piston, and wherein the suction part comprises a fixator arranged below the main body pipe and a suction nozzle assembled below the fixator, the fixator comprises a first assembling body located at an upper part of the fixator to be assembled with the lower part of the main body pipe, a second assembling body located at a lower part of the fixator which is opposite to the first assembling body, a second buckle formed on an outer periphery of the first assembling body and arranged at the same side of the main body pipe as the first buckle, and a first tubular connector formed on the outer periphery of the first assembling body and located below the second buckle, and wherein the first tubular connector is provided with a water inlet being in fluid communication with an interior of the fixator; and a water replenishing unit, provided to replenish water when the push-pull unit is implemented, wherein the water replenishing unit comprises a water replenishing pipe located on one side of the main body pipe and correspondingly clamped with the main body pipe, an upper cover group covering a top of the water replenishing pipe and clamped with the pulling part, and a lower cover group covering a bottom of the water replenishing pipe and clamped with the suction part, and wherein the upper cover group comprises a ventilation and pressure relief pipe body arranged in the water replenishing pipe and provided with a ventilation and pressure relief hole, an upper fixing body arranged on an upper part of the water replenishing pipe, an upper cover ring body arranged on an upper part of the upper fixing body, and an upper cover covering the upper cover ring body and provided for an upper part of the ventilation and pressure relief pipe body to penetrate, and wherein the upper fixing body comprises a first embedded hole for the upper part of the water replenishing pipe to penetrate, and a first buckling body formed on an outer periphery of the upper fixing body and clamped with the first buckle, and wherein the upper cover ring body comprises a second embedded hole communicated with the first embedded hole and provided for the upper part of the water replenishing pipe to penetrate, and a convex block connected with an inner periphery of the second embedded hole and provided with a first insertion hole for the ventilation and pressure relief pipe body to penetrate, and wherein the upper cover comprises a first inner sleeve hole provided for the upper cover ring body to be inserted, a second insertion hole formed on the top of the upper cover and spaced apart from the first insertion hole, and a ventilation hole formed on the top of the upper cover and spaced apart from the second insertion hole, wherein an upper part of the ventilation and pressure relief pipe extends into the second insertion hole, and a plug body configured to plug the ventilation hole is provided, wherein the lower cover group comprises an anti-backflow piece abutting an inner bottom of the water replenishing pipe and comprising a plurality of outlets, a water blocker arranged at the bottom of the anti-backflow piece and configured to uncover or cover the plurality of outlets of the anti-backflow piece so as to place the plurality of outlets in either a circulating state or a blocking state, a lower cover covering a lower part of the water replenishing pipe and moving when the water replenishing pipe rotates, a gasket arranged at the bottom of the lower cover and provided for the lower part of the ventilation and pressure relief pipe body to penetrate, a lower cover seat covering the lower cover, and a communication pipe communicating the water replenishing pipe with the main body pipe, wherein the anti-backflow piece comprises a third insertion hole corresponding to the first insertion hole and provided for the lower part of the ventilation and pressure relief pipe body to penetrate, and wherein the lower cover comprises a second inner sleeve hole provided to place the lower part of the water replenishing pipe, a fourth insertion hole formed in the lower cover and corresponding to the third insertion hole, an adjustment groove formed in the lower cover and spaced apart from the fourth insertion hole, a convex connecting cover located at the top of the lower cover, and a channel formed in the lower cover and spaced apart from the fourth insertion hole and the adjustment groove, wherein the lower part of the ventilation and pressure relief pipe body extends into the fourth insertion hole, and the convex connecting cover is provided with a third inner sleeve hole for placing the lower part of the water replenishing pipe, the bottom of the convex connecting cover abuts the top of the lower cover, and wherein the gasket comprises a fifth insertion hole and a through hole spaced apart from the fifth insertion hole, and wherein the lower cover seat comprises a fourth inner sleeve hole for placing the gasket and the lower cover, a second tubular connector located at the bottom of the lower cover seat and corresponding to the fifth insertion hole, a positioning convex grain formed at an inner bottom of the fourth inner sleeve hole and spaced apart from the second tubular connector, a second buckling body formed at the outer periphery of the lower part of the lower cover seat, located on a same side of the water replenishing unit as the first buckling body and correspondingly buckled with the second buckle, and a press-down screw cap screwed on an upper part of the lower cover seat, wherein the second tubular connector is provided with a water outlet communicated with the fourth inner sleeve hole and the ventilation and pressure relief hole, and wherein the positioning convex grain penetrates into the through hole of the gasket and the adjustment groove of the lower cover and is provided as an axial point when the lower cover is rotated, and wherein the communication pipe comprises a first connector sleeved on the second tubular connector and communicated with the water outlet, and a second connector sleeved on the first tubular connector and communicated with the water inlet, wherein the water-replenishing pipe dredging device is configured to fluid communicate the ventilation and pressure relief pipe body with the main body pipe by rotating the upper cover to a first fixed position, wherein the water-replenishing pipe dredging device is configured to fluid communicate the plurality of outlets of the anti-backflow piece with the channel and the water outlet to let water in the water replenishing pipe is capable of smoothly entering the main body pipe through the water outlet and the water inlet by rotating the upper cover to a second fixed position and removing the plug body from the ventilation hole.

Further, the straight pipe body comprises a hollow interior, and a first holding part is arranged on an upper part of the handle, and a sleeve hole for sleeving and fixing the straight pipe body is formed in a lower part of the handle, and the push piece is an I-shaped unit, and the push piece comprises an abutting body projects from a bottom of the push piece and is provided with a first penetration hole, and a sleeving and fixing body located on the upper part of the push piece and tightly sleeved on the outer periphery of the straight pipe body, and a lower part of the straight pipe body projects through interiors of the sleeving and fixing body and the push piece, and the lower part of the straight pipe body abuts the interior of the abutting body, and the grip cover comprises a second penetration hole located on an upper part of the grip cover and communicated with the accommodating space, and a horizontal grip connected with the grip cover, the horizontal grip is arranged on a side of the grip cover opposite of the first buckle and projecting outwardly away from the grip cover, and the straight pipe body is inserted through the second penetration hole and penetrates into the sleeve hole for fixing, and the first buckle is provided with a first sleeving part and a first fixing hole located inside the first sleeving part, and the first sleeving part is concave arc-shaped, and the first fixing hole is a screw hole, and the horizontal grip is provided with a second holding part, and an upper part of the piston comprises a space, and an lower part of the piston comprises a space, wherein the space in the upper part is used for arranging an upper gasket, and the space in the lower part is used for arranging a lower gasket, and wherein a convex part is arranged at the bottom of the upper gasket, and a concave part is arranged at the top of the lower gasket and is configured to receive the convex part of the upper gasket, and the convex part of the upper gasket and the concave part of the lower gasket are each provided with a third penetration hole, and the third penetration holes are in alignment with one another, wherein the pull rod comprises a convex part, a first rod body connected with the lower part of the convex part of the pull rod and having an outer diameter smaller than that of the convex part of the pull rod, and a second rod body connected with the bottom of the first rod body, and wherein the pull rod penetrates into the hollow interior of the straight pipe body and abuts the interior of the abutting body with the convex part of the pull rod, and wherein the first rod body penetrates into the first penetration hole and is located between the abutting body and the upper gasket, and the second rod body is provided with a convex connecting rod penetrating into the third penetration holes and a screw rod arranged at the bottom of the convex connecting rod and projecting downwardly from the convex connecting rod, and wherein the screw rod is screwed and fixed at the bottom of the lower gasket through a nut.

Further, the outer diameter of the convex connecting rod is smaller than that of the first rod body, and the outer diameter of the screw rod is smaller than that of the convex connecting rod.

Further, the first buckling body is provided with a first clamping groove for being clamped with the first sleeving part of the first buckle, and a first fixing piece penetrates into the first buckling body and the first fixing hole of the first buckle to fix the first buckling body and the first buckle, and wherein the upper cover ring body comprises a plurality of convex blocking bodies convexly arranged on the outer periphery of the upper cover ring body, and wherein the upper cover comprises an annular groove formed at an inner bottom of the upper cover, and a plurality of notches located on the inner periphery of the upper cover and provided to clamp the convex blocking bodies, and wherein a gasket body is received within the annular groove, and the gasket body is configured to form a seal between the upper cover and the upper cover ring body.

Further, the first assembling body is provided with a sleeving part comprising a first opening for assembling the lower part of the main body pipe, and the second assembling body is provided with a first locking part comprising a second opening communicated with the first opening, and wherein the first locking part comprises an external thread, and wherein the second buckle is provided with a second sleeving part and a second fixing hole located in the second sleeving part, and the second sleeving part is concave arc-shaped, and the second fixing hole is a screw hole, and the water inlet of the first tubular connector is communicated with the first opening and the second opening, and the outer periphery of the first tubular connector is provided with an external thread, and wherein the suction nozzle is assembled on the second assembling body of the fixator, and the suction nozzle comprises a second locking part having a third opening and a pipe plug part opposite to the second locking part, and wherein the second locking part comprises an internal thread, and the internal thread is correspondingly screwed with the external thread of the first locking part, and the pipe plug part is provided with a pipe port communicated with the third opening.

Further, the pipe plug part is shaped as a conical body tapering from the second locking part.

Further, the anti-backflow piece comprises a fixing hole located at a center of the plurality of outlets of the anti-backflow piece, and a convex wall protruding from a bottom end of the anti-backflow piece, and wherein the upper part of the convex wall is sleeved with a washer to abut the bottom of the water replenishing pipe, and wherein the water blocker comprises an abutting block axially connected to the fixing hole and protruding above the fixing hole, and a water blocking surface connected with one end of the abutting block and having an outer diameter greater than that of the abutting block, and wherein the water blocker and the anti-backflow piece are configured to form a gap between the water blocking surface of the water blocker and the anti-backflow piece, the gap is in fluid communication with the plurality of the outlets of the anti-backflow piece, and the adjustment groove is arc-shaped, and wherein the second buckling body is provided with a second clamping groove for being clamped with the second sleeving part of the second buckle, and a second fixing piece penetrates into the second buckling body and the second fixing hole of the second buckle to fix the second buckling body and the second buckle, and wherein an external thread is formed on the outer periphery of the upper part of the lower cover seat, and wherein the top of the press-down screw cap is provided with a through hole for the upper part of the convex connecting cover to penetrate and abut, and wherein an internal thread correspondingly screwed with the external thread of the lower cover seat is arranged on an inner periphery of the press-down screw cap, and the press-down screw cap is screwed down to adjust a tightness of the press-down screw cap, and wherein the communication pipe is a vertical bent pipe, and the first connector is provided with an O-ring located between the first connector and the second tubular connector and provided to make the first connector be sleeved tightly, and the inner periphery of the second connector is provided with an internal thread correspondingly screwed with the external thread of the first tubular connector.

Further, the anti-backflow piece is recessed cap shape.

Further, an accommodating hole located close to the ventilation hole is formed in the upper part of the upper cover, and the accommodating hole is used for arranging the plug body.

Through the implementation of the invention, compared with the prior art, the water-replenishing pipe dredging device provided by the invention has the following characteristics: when the pulling part is operated to pump water upward, the pulling part is pulled upward to a fixed position; and the remaining water in the water replenishing pipe will be injected into an extra space formed by upward movement of the pulling part in the main body pipe until a water level of the main body pipe is flush with that of the water replenishing pipe, so that the impact force of water in the main body pipe can be conveniently applied, can be completely transmitted to a blocked end, and can effectively clear blockages in a drainage pipeline.

DETAILED DESCRIPTION OF THE PREFERRED EMBODIMENTS

Figure 1:
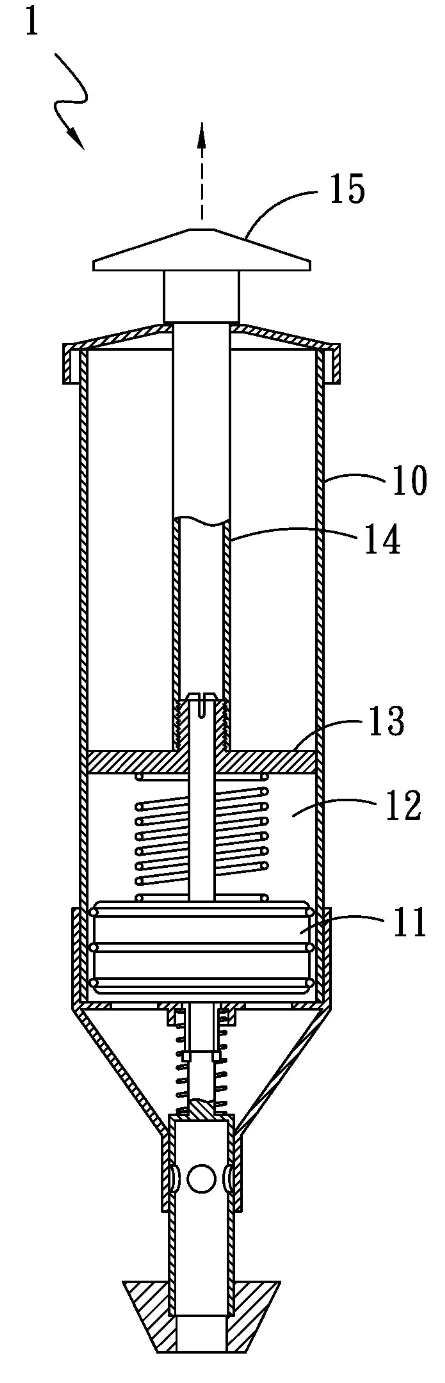
Fig.1 PRIOR ART
FIG. 1 is a schematic diagram of pumping of water of the hydraulic pipe dredging device disclosed in TW 1292806.
Figure 2:
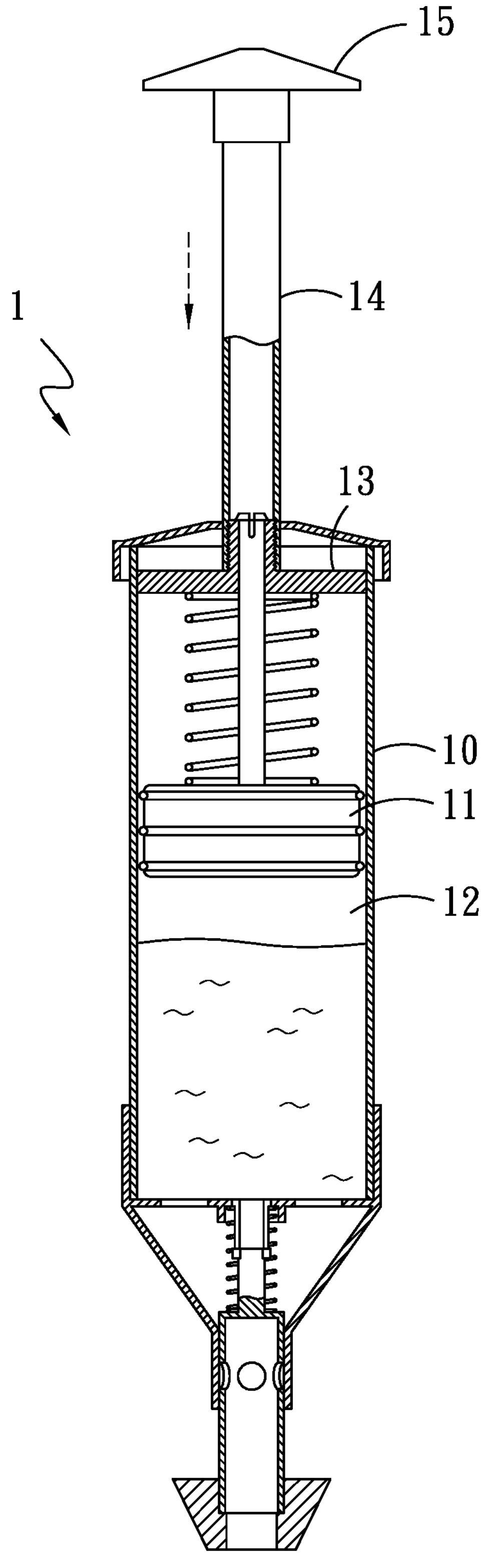
Fig.2 PRIOR ART
FIG. 2 is a schematic diagram of pressing-out of water by the hydraulic pipe dredging device in FIG. 1.
Figure 3:
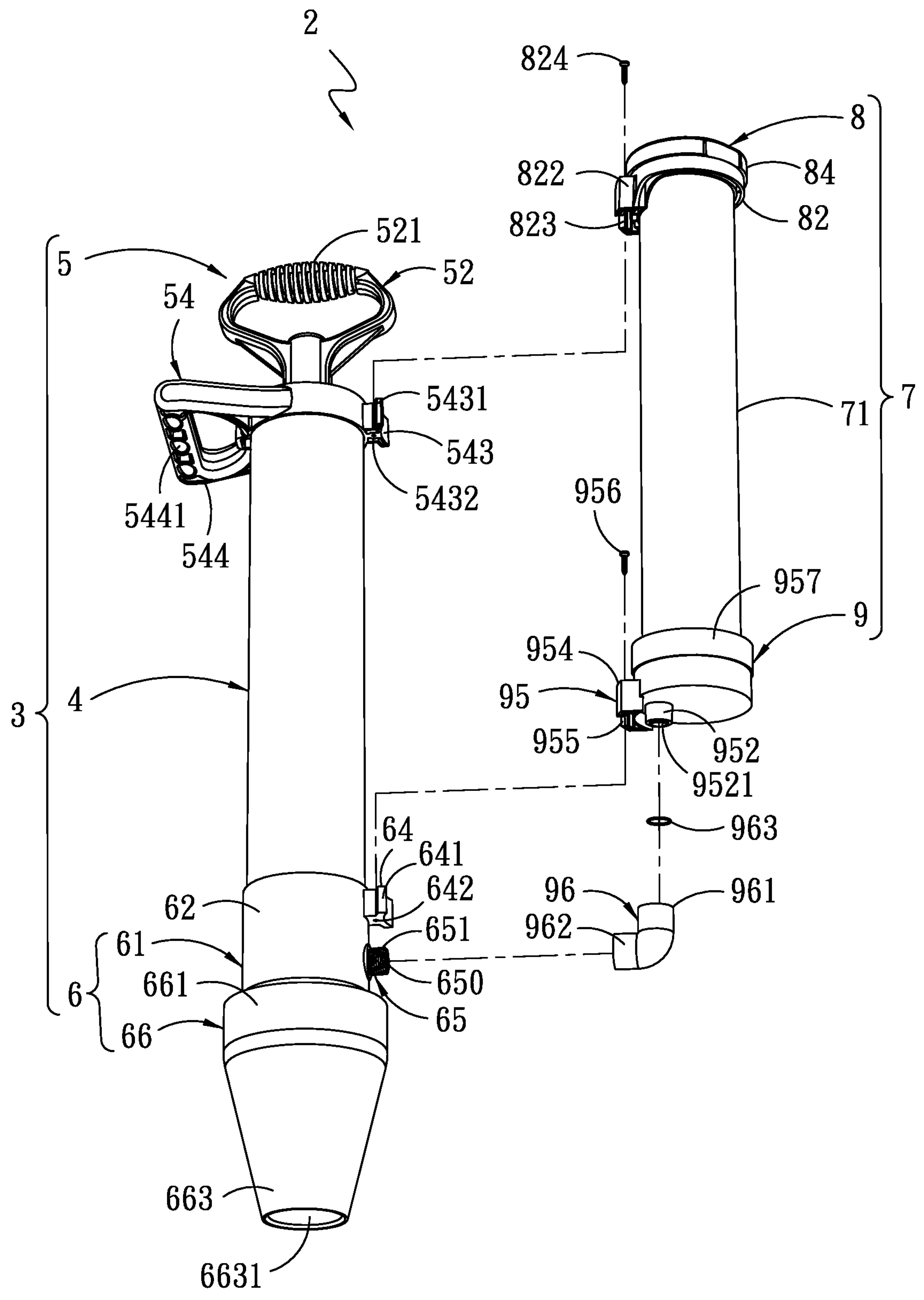
FIG. 3 is an exploded perspective view of a water-replenishing pipe dredging device provided by the invention.
Figure 4:
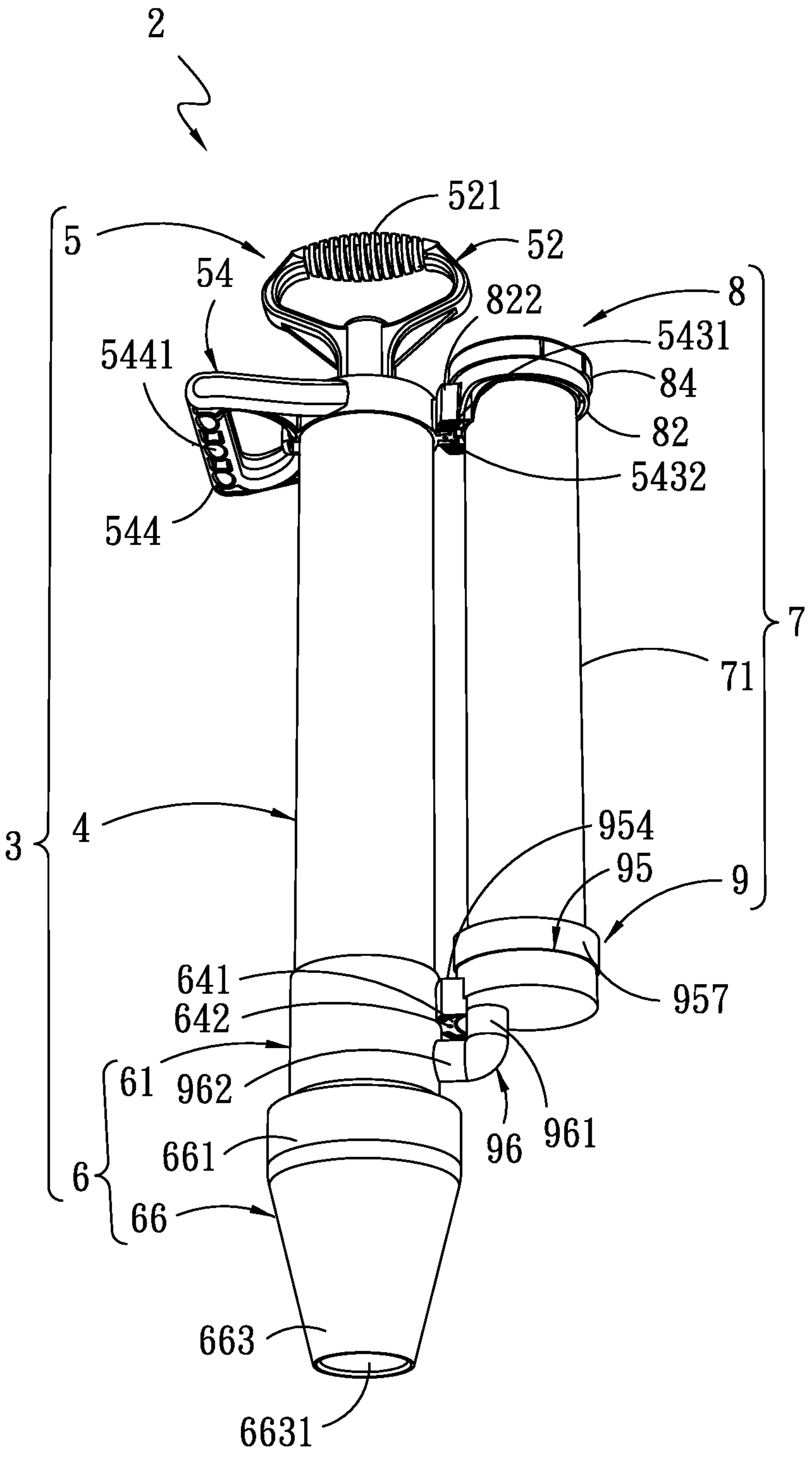
FIG. 4 is a perspective view of combination of the water-replenishing pipe dredging device in FIG. 3.
Figure 5:
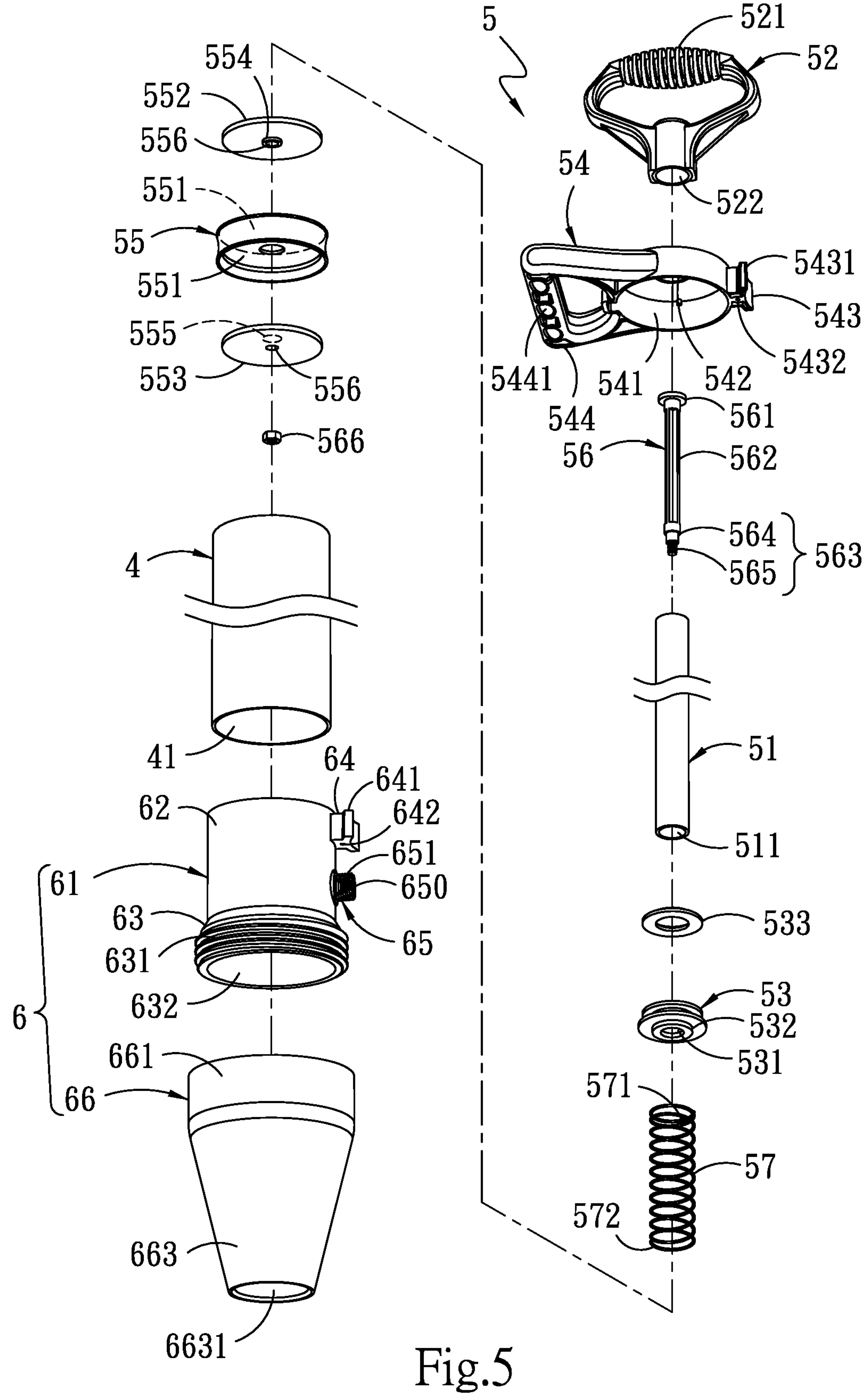
FIG. 5 is an exploded perspective view of a push-pull unit of the water-replenishing pipe dredging device in FIG. 3.
Figure 6:
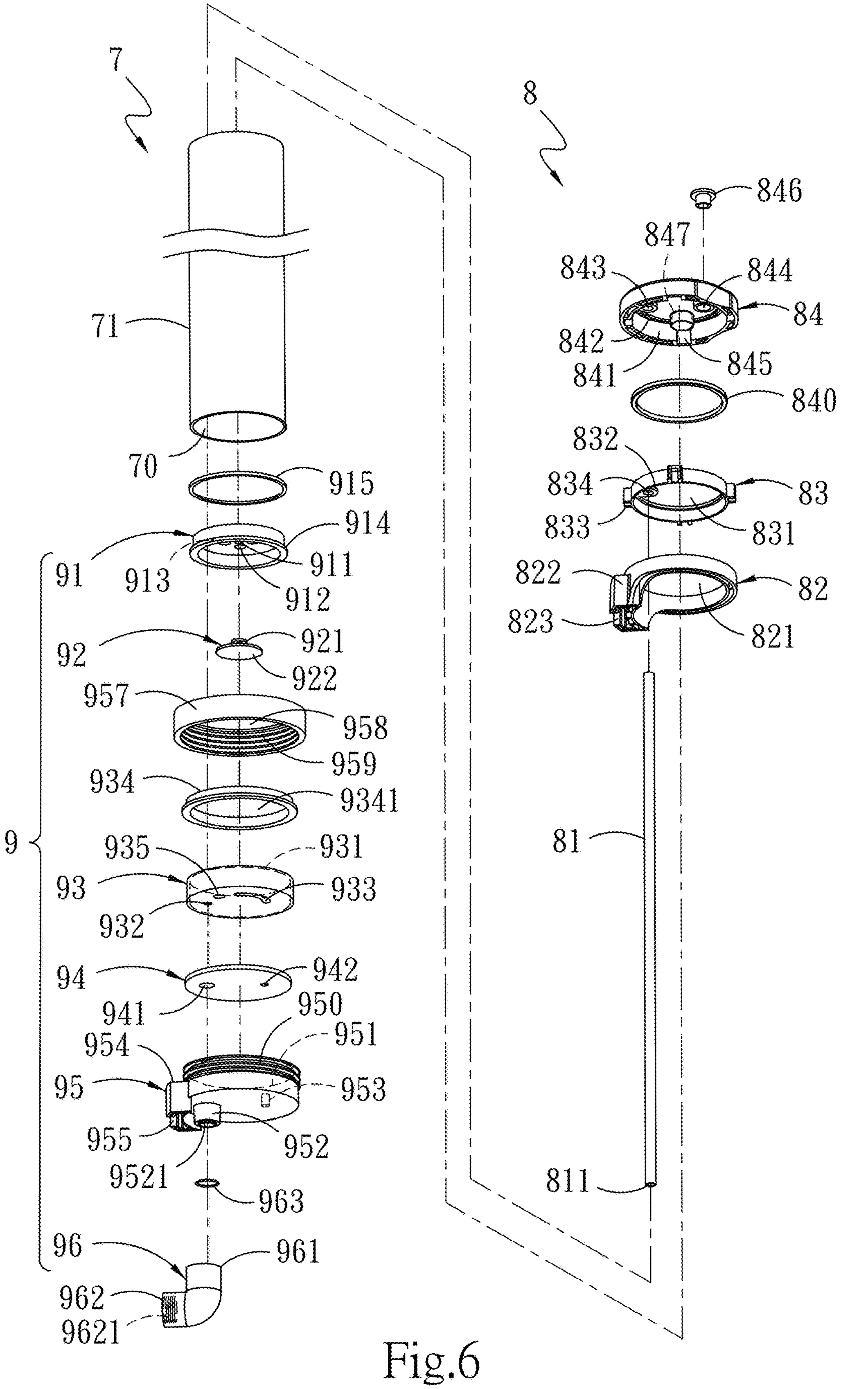
FIG. 6 is an exploded perspective view of a water replenishing unit of the water-replenishing pipe dredging device in FIG. 3.
Figure 7:
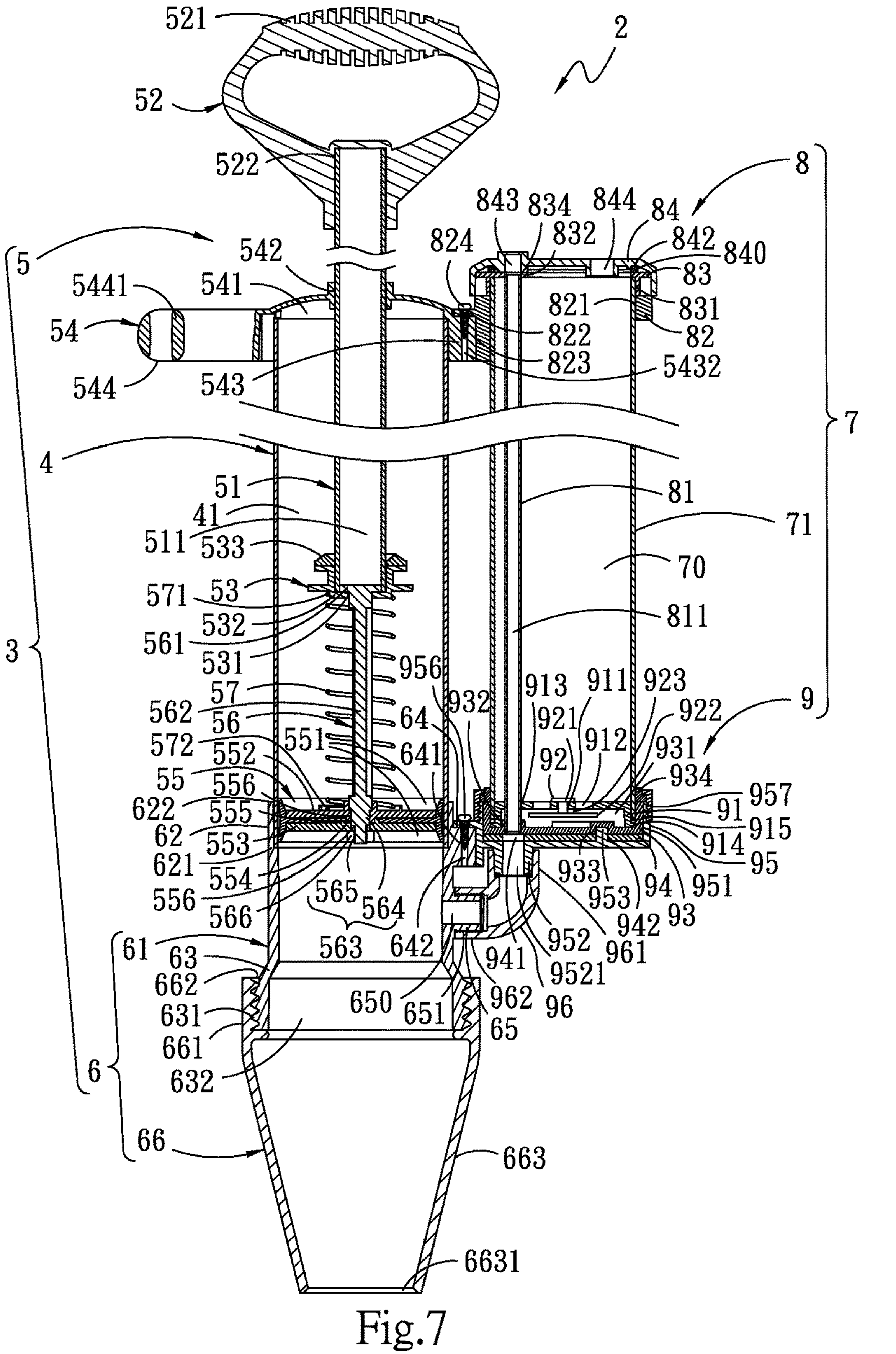
FIG. 7 is a combined sectional view of the water-replenishing pipe dredging device in FIG. 3.

The detailed description and the technical content of the invention are described in cooperation with the drawings as follows now:

Referring to FIG. 3, FIG. 4, FIG. 5, FIG. 6, and FIG. 7, the invention provides a water-replenishing pipe dredging device. The water-replenishing pipe dredging device 2 comprises a push-pull unit 3 and a water replenishing unit 7.

The push-pull unit 3 comprises a main body pipe 4 comprising a hollow interior 41, a pulling part 5 connected with a first end of the main body pipe 4 and configured to extend and retract inside the hollow interior 41 of the main body pipe 4, and a suction part 6 connected with a second end of the main body pipe 4. The second end of the main body pipe 4 is opposite to the end to which the pulling part 5 is connected.

Referring to FIG. 3, FIG. 4, FIG. 5, FIG. 6, and FIG. 7, the pulling part 5 comprises a straight pipe body 51, a handle 52, a push piece 53, a grip cover 54, a piston 55, a pull rod 56 and a compression spring 57. The straight pipe body 51 penetrates into the hollow interior 41 of the main body pipe 4. The straight pipe body 51 comprises a hollow interior 511. The handle 52 is arranged on an upper part of the straight pipe body 51 and drives the straight pipe body 51 to move in the main body pipe 4. An upper part of the handle 52 is provided with a first holding part 521 for hand holding, and a lower part of the handle 52 is provided with a sleeve hole 522 for sleeving and fixing the straight pipe body 51. The push piece 53 is arranged on a lower part of the straight pipe body 51, and the push piece 53 is an I-shaped unit. The push piece 53 comprises an abutting body 532 and a sleeving and fixing body 533, wherein the abutting body 532 projects from a bottom of the push piece 53 and is provided with a first penetration hole 531, and the sleeving and fixing body 533 is located on an upper part of the push piece 53 and tightly sleeved on an outer periphery of the straight pipe body 51. A lower part of the straight pipe body 51 projects through interiors of the sleeving and fixing body 533 and the push piece 53, so that the lower part of the straight pipe body 51 abuts against the interior of the abutting body 532. The grip cover 54 is arranged on the upper part of the main body pipe 4, and the grip cover 54 comprises an accommodating space 541 formed at the bottom of the grip cover 54 and provided with a downward opening, a second penetration hole 542 located on the upper part of the grip cover 54 and penetrating through the accommodating space 541, a first buckle 543 formed on one side of the outer periphery of the grip cover 54, and a horizontal grip 544 connected with the grip cover 54, and the horizontal grip 544 is arranged on a side of the grip cover 54 opposite of the first buckle 543 and projecting outwardly away from the grip cover 54. The straight pipe body 51 is inserted through the second penetration hole 542 and penetrates into the sleeve hole 522 for fixing. The first buckle 543 is provided with a first sleeving part 5431 and a first fixing hole 5432 located inside the first sleeving part 5431, wherein the first sleeving part 5431 is concave arc-shaped, and the first fixing hole 5432 is a screw hole. The horizontal grip 544 is provided with a second holding part 5441 for hand holding. The piston 55 is arranged inside the lower part of the hollow interior 41 of the main body pipe 4, and an upper part of the piston 55 comprises a space 551, and an lower part of the piston 55 comprises a space 551, wherein the space 551 in the upper part is used for arranging an upper gasket 552, and the space 551 in the lower part is used for arranging a lower gasket 553. The upper gasket 552 is assembled with the lower gasket 553 in an embedding manner. A convex part 554 is arranged at the bottom of the upper gasket 552, the top of the lower gasket 553 is provided with a concave part 555, and the concave part 555 is configured to receive the convex part 554 of the upper gasket 552. The convex part 554 of the upper gasket 552 and the concave part 555 of the lower gasket 553 are each provided with a third penetration hole 556, and the third penetration holes 556 are in alignment with one another. The pull rod 56 penetrates into the straight pipe body 51 and the piston 55, and the pull rod 56 comprises a convex part 561, a first rod body 562 connected with a lower part of the convex part 561 of the pull rod 56 and having an outer diameter smaller than that of the convex part 561 of the pull rod 56, and a second rod body 563 connected with the bottom of the first rod body 562. The pull rod 56 penetrates into the hollow interior 511 of the straight pipe body 51, and abuts against the interior of the abutting body 532 with the convex part 561 of the pull rod 56. The first rod body 562 penetrates into the first penetration hole 531 and is located between the abutting body 532 and the upper gasket 552. The second rod body 563 is provided with a convex connecting rod 564 and a screw rod 565, wherein the convex connecting rod 564 penetrates into the third penetration holes 556 and having an outer diameter smaller than that of the first rod body 562, and the screw rod 565 is arranged at the bottom of the convex connecting rod 564, projects downwardly from the convex connecting rod 564 and has an outer diameter smaller than that of the convex connecting rod 564. The screw rod 565 is screwed and fixed at the bottom of the lower gasket 553 by a nut 566. The compression spring 57 is sleeved on an outer surface of the pull rod 56. One end 571 of the compression spring 57 abuts against the exterior of the abutting body 532, and an other end 572 abuts against the upper gasket 552. The compression spring 57 is configured to be extended and compressed between the abutting body 532 of the push piece 53 and the upper gasket 552 of the piston 55.

Referring to FIG. 3, FIG. 4, FIG. 5, FIG. 6, and FIG. 7, the suction part 6 comprises a fixator 61 and a suction nozzle 66. The fixator 61 is arranged on the lower part of the main body pipe 4. The fixator 61 comprises a first assembling body 62 located on an upper part of the fixator 61, a second assembling body 63 located on a lower part of the fixator 61 which is opposite to the first assembling body 62, a second buckle 64 formed on an outer periphery of the first assembling body 62 and arranged at the same side of the main body pipe as the first buckle 543, and a first tubular connector 65 formed on the outer periphery of the first assembling body 62 and located below the second buckle 64. The first assembling body 62 is provided with a sleeving part 621 having a first opening 622, and the sleeving part 621 is provided for sleeving and fixing the lower part of the main body pipe 4. The second assembling body 63 is provided with a first locking part 631 having a second opening 632 communicated with the first opening 622, and the first locking part 631 is provided with an external thread. The second buckle 64 is provided with a second sleeving part 641 and a second fixing hole 642 located inside the second sleeving part 641. The second sleeving part 641 is concave arc-shaped, and the second fixing hole 642 is a screw hole. The first tubular connector 65 is provided with a water inlet 650 communicated with the first opening 622 and the second opening 632, e.g. being in fluid communication with an interior of the fixator 61, and the outer periphery of the first tubular connector 65 is provided with an external thread 651. The suction nozzle 66 is assembled on the second assembling body 63 of the fixator 61, and the suction nozzle 66 comprises a second locking part 661 having a third opening 662 and a pipe plug part 663 opposite to the second locking part 661, wherein the second locking part 661 is assembled with the first locking part 631 of the fixator 61 in a screwing manner. The second locking part 661 is provided with an internal thread, and the internal thread is correspondingly screwed with the external thread of the first locking part 631. Please refer to FIG. 13 together. The shape of the pipe plug part 663 is mainly matched with the diameter of a drainage port A11 of a drainage pipeline A1 of a toilet A to form a conical body tapering from the second locking part 661. The pipe plug part 663 is provided with a pipe port 6631 communicated with the third opening 662.

Referring to FIG. 3, FIG. 4, FIG. 5, FIG. 6, and FIG. 7, the water replenishing unit 7 is used for replenishing water when the push-pull unit 3 is implemented. The water replenishing unit 7 comprises a water replenishing pipe 71, an upper cover group 8, and a lower cover group 9, wherein the water replenishing pipe 71 is located on one side of the main body pipe 4 and correspondingly clamped with the main body pipe 4, the upper cover group 8 covers the top of the water replenishing pipe 71 and is clamped with the pulling part 5, and the lower cover group 9 covers the bottom of the water replenishing pipe 71 and is clamped and communicated with the suction part 6. The water replenishing pipe 71 comprises a hollow interior 70.

Referring to FIG. 3, FIG. 4, FIG. 5, FIG. 6, and FIG. 7, the upper cover group 8 comprises a ventilation and pressure relief pipe body 81 having a ventilation and pressure relief hole 811, an upper fixing body 82, an upper cover ring body 83 and an upper cover 84. The ventilation and pressure relief pipe body 81 is arranged in the water replenishing pipe 71. The upper fixing body 82 is arranged on the upper part of the water replenishing pipe 71, and the upper fixing body 82 comprises a first embedded hole 821 for the upper part of the water replenishing pipe 71 to penetrate, and a first buckling body 822 formed on the outer periphery of the upper fixing body 82. The first buckling body 822 is provided with a first clamping groove 823 for being clamped with the first sleeving part 5431 of the first buckle 543, so that the first buckling body 822 and the first buckle 543 are fixed by penetrating a first fixing piece 824 through the interior of the first buckling body 822 and the first fixing hole 5432 of the first buckle 543. The upper cover ring body 83 is arranged on an upper part of the upper fixing body 82, and the upper cover ring body 83 comprises a second embedded hole 831 communicated with the first embedded hole 821 and provided for the upper part of the water replenishing pipe 71 to penetrate, a convex block 832 connected with the inner periphery of the second embedded hole 831, and a plurality of convex blocking bodies 833 convexly arranged on the outer periphery of the upper cover ring body 83. The convex block 832 is provided with a first insertion hole 834 for inserting the upper part of the ventilation and pressure relief pipe body 81. The upper cover 84 covers the upper cover ring body 83, and the upper cover 84 comprises a first inner sleeve hole 841 provided for the upper cover ring body 83 to be inserted, an annular groove 842 formed inside the upper cover 84 and provided for a gasket body 840 to be inserted, a second insertion hole 843 formed on the top of the upper cover 84 and corresponding to the first insertion hole 834, a ventilation hole 844 formed on the top of the upper cover 84 and spaced apart from the second insertion hole 843, and a plurality of notches 845 located on the inner periphery of the upper cover 84 and used for clamping the convex blocking bodies 833. The second insertion hole 843 is communicated with the first inner sleeve hole 841 and is penetrated by the upper part of the ventilation and pressure relief pipe body 81. When placing the upper cover ring body 83 into the first inner sleeve hole 841 to cover the upper cover ring body 83 by the upper cover 84, the plurality of notches 845 of the upper cover 84 are correspondingly clamped with the plurality of convex blocking bodies 833, so that the gasket body 840 forms a seal between the upper cover 84 and the upper cover ring body 83. The ventilation hole 844 is plugged by a plug body 846. In one embodiment, the upper part of the upper cover 84 is provided with an accommodating hole 847 opposite to the ventilation hole 844, and the accommodating hole 847 is used for placing and accommodating the plug body 846 taken out from the ventilation hole 844 without losing, so that the plug body 846 can plug the ventilation hole 844 again after use.

Figure 10:
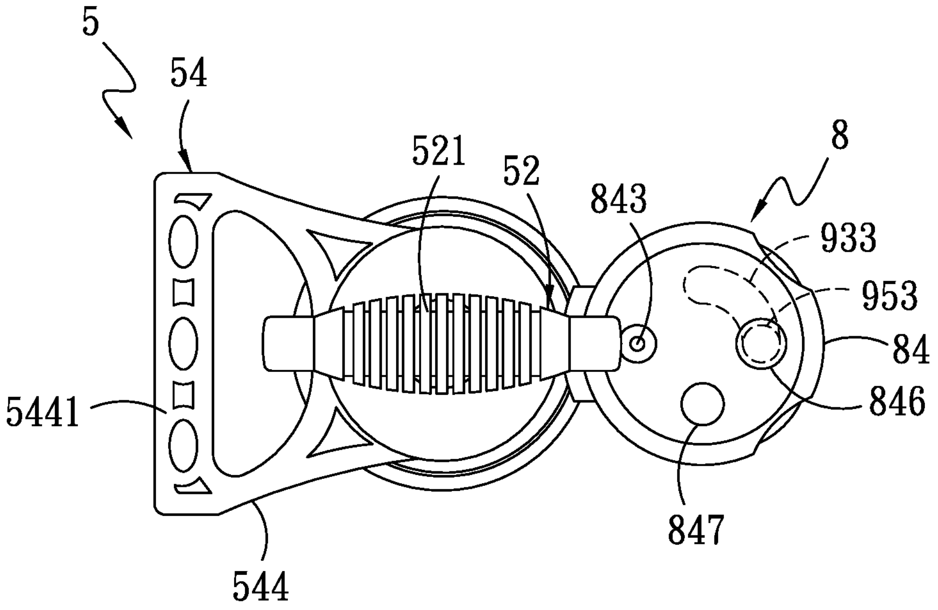
FIG. 10 is a top view of an upper cover of the water-replenishing pipe dredging device in FIG. 9.
Figure 12:
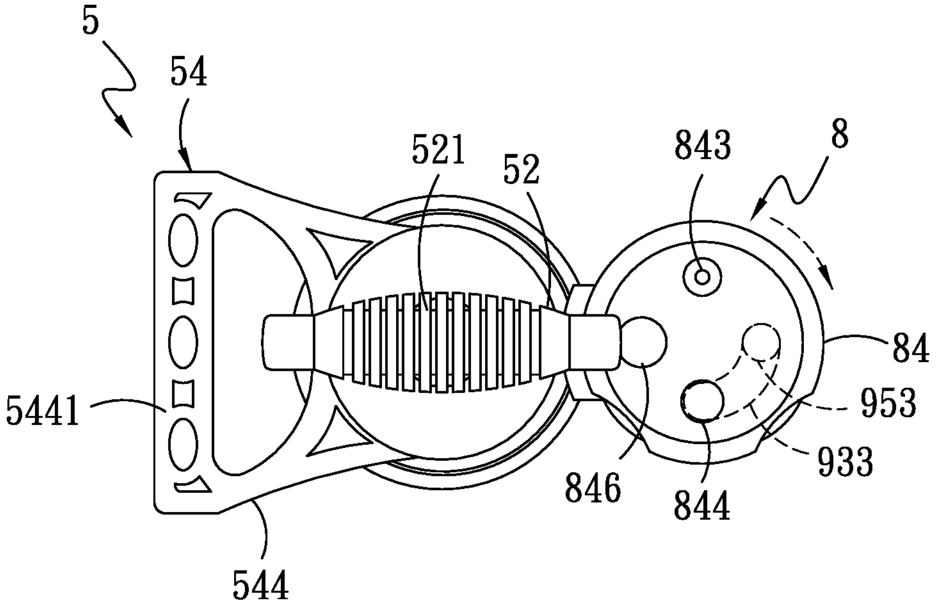
FIG. 12 is a top view of the upper cover of the water-replenishing pipe dredging device in FIG. 11.

Referring to FIG. 3, FIG. 4, FIG. 5, FIG. 6, and FIG. 7, the lower cover group 9 comprises an anti-backflow piece 91, a water blocker 92, a lower cover 93, a gasket 94, a lower cover seat 95 and a communication pipe 96. The anti-backflow piece 91 is recessed cap shape and abuts against the inner bottom of the water replenishing pipe 71. The anti-backflow piece 91 comprises a fixing hole 911 located at a center of the anti-backflow piece 91, a plurality of outlets 912 distributed on the outer periphery of the fixing hole 911, a third insertion hole 913 corresponding to the first insertion hole 834 and allowing the lower part of the ventilation and pressure relief pipe body 81 to penetrate, and a convex wall 914 protruding from the bottom of the anti-backflow piece 91. A washer 915 is sleeved on an upper part of the convex wall 914, and the washer 915 is used for abutting against the bottom of the water replenishing pipe 71. The water blocker 92 is arranged at the bottom of the anti-backflow piece 91 for the plurality of outlets 912 to form a circulating state or a blocking state. The water blocker 92 comprises an abutting block 921 axially connected to the fixing hole 911 and extended above the fixing hole 911, and a water blocking surface 922 connected with one end of the abutting block 921 and having an outer diameter greater than that of the abutting block 921. The water blocker 92 and the anti-backflow piece 91 are configured to form a gap 923 between the water blocking surface 922 of the water blocker 92 and the anti-backflow piece 91, and the gap 923 is in fluid communication with the plurality of outlets 912 of the anti-backflow piece 91 to allow the water inside the water replenishing pipe 71 to flow out from the plurality of outlets 912. In one embodiment, the outer diameter of the water blocking surface 922 is sufficient to be pushed upward by the backflow to block the plurality of outlets 912. The lower cover 93 covers the lower part of the water replenishing pipe 71 and moves when the water replenishing pipe 71 rotates. The lower cover 93 comprises a second inner sleeve hole 931 for inserting the lower part of the water replenishing pipe 71, a fourth insertion hole 932 formed in the lower cover 93 and corresponding to the third insertion hole 913, an adjustment groove 933 formed in the lower cover 93 and spaced apart from the fourth insertion hole 932, a convex connecting cover 934 located at the top of the lower cover 93, and a channel 935 formed in the lower cover 93 and spaced apart from the fourth insertion hole 932 and the adjustment groove 933. The fourth insertion hole 932 is communicated with the second inner sleeve hole 931 and is provided for the lower part of the ventilation and pressure relief pipe body 81 to penetrate. The convex connecting cover 934 is provided with a third inner sleeve hole 9341 for inserting the lower part of the water replenishing pipe 71, so that the bottom of the convex connecting cover 934 abuts against the top of the lower cover 93. In one embodiment, the adjustment groove 933 is arc-shaped. The gasket 94 is arranged at the bottom of the lower cover 93, and the gasket 94 comprises a fifth insertion hole 941 corresponding to the fourth insertion hole 932, and a through hole 942 spaced apart from the adjustment groove 933. The lower cover seat 95 covers the lower cover 93, and the lower cover seat 95 comprises a fourth inner sleeve hole 951 for inserting the gasket 94 and the lower cover 93, a second tubular connector 952 located at the bottom of the lower cover seat 95 and corresponding to the fifth insertion hole 941, a positioning convex grain 953 formed at the inner bottom of the fourth inner sleeve hole 951 and spaced apart from the second tubular connector 952, a second buckling body 954 formed at the outer periphery of the lower part of the lower cover seat 95 and located on the same side as the first buckling body 822, and a press-down screw cap 957 screwed on an upper part of the lower cover seat 95. The positioning convex grain 953 penetrates into the through hole 942 and the adjustment groove 933, and the positioning convex grain 953 is provided as an axial point when the lower cover 93 is rotated (as shown in FIG. 10 and FIG. 12). The second buckling body 954 is provided with a second clamping groove 955 for being clamped with the second sleeving part 641 of the second buckle 64, so that the second buckling body 954 and the second buckle 64 are fixed by penetrating a second fixing piece 956 through the interior of the second buckling body 954 and the second fixing hole 642 of the second buckle 64. In one embodiment, an external thread 950 is formed on the outer periphery of the lower cover seat 95, and the second tubular connector 952 is provided with a water outlet 9521 communicated with the fourth inner sleeve hole 951. The top of the press-down screw cap 957 is provided with a through hole 958 for the convex connecting cover 934 to penetrate and abut, and an internal thread 959 correspondingly screwed with the external thread 950 of the lower cover seat 95 is arranged on the inner periphery of the press-down screw cap 957. The press-down screw cap 957 is screwed down to adjust the press-down tightness of the press-down screw cap 957. The communication pipe 96 is a vertical bent pipe to communicate the water replenishing pipe 71 with the main body pipe 4. The communication pipe 96 comprises a first connector 961 sleeved on the second tubular connector 952 and communicated with the water outlet 9521, and a second connector 962 sleeved on the first tubular connector 65 and communicated with the water inlet 650, wherein the first connector 961 is provided with an O-ring 963 located between the first connector 961 and the second tubular connector 952 and used for making the first connector 961 sleeved tightly; and the inner periphery of the second connector 962 is provided with an internal thread 9621 correspondingly screwed with the external thread 651 of the first tubular connector 65.

Figure 8:
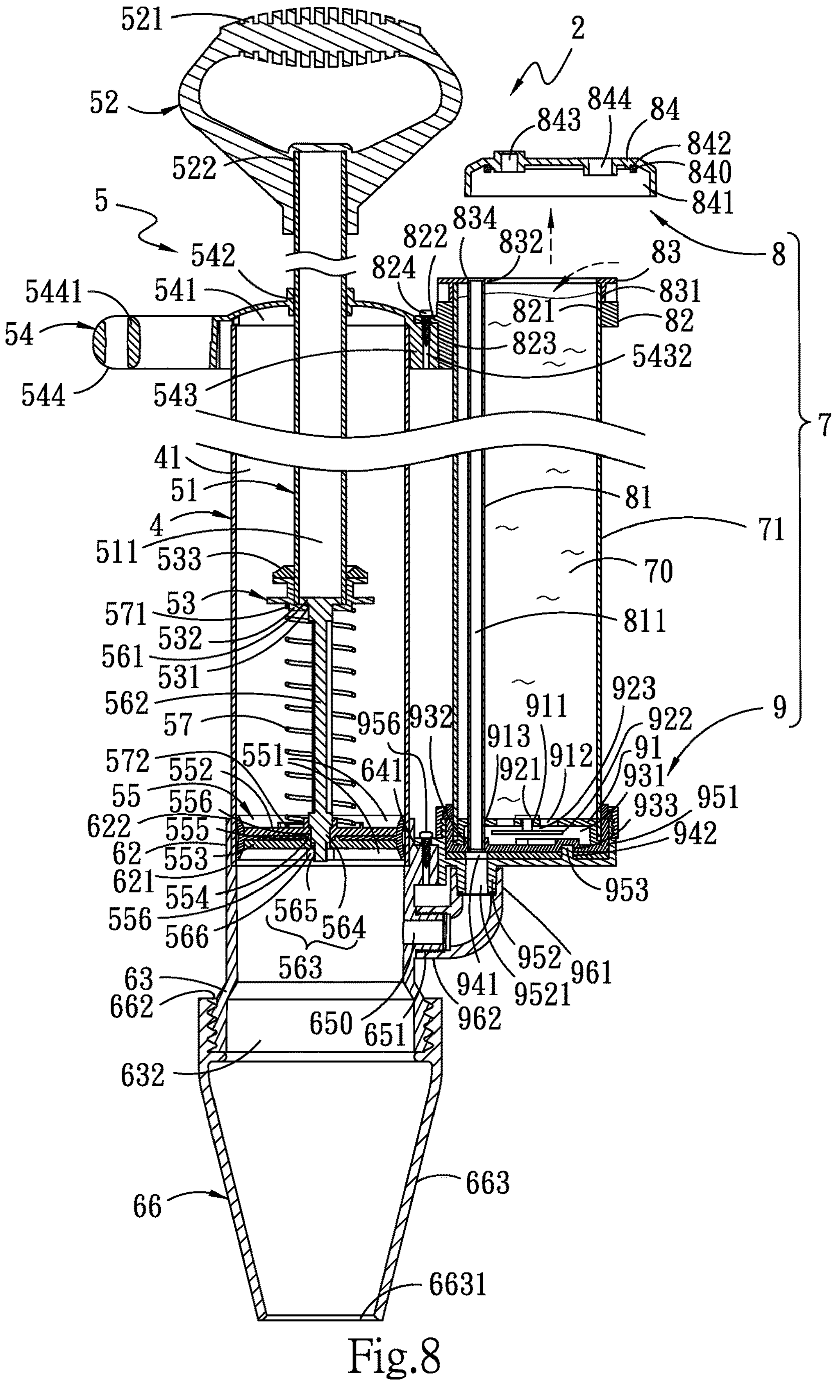
FIG. 8 is a schematic diagram of actions of removing upper and lower covers and injecting water of the water-replenishing pipe dredging device in FIG. 3.
Figure 9:
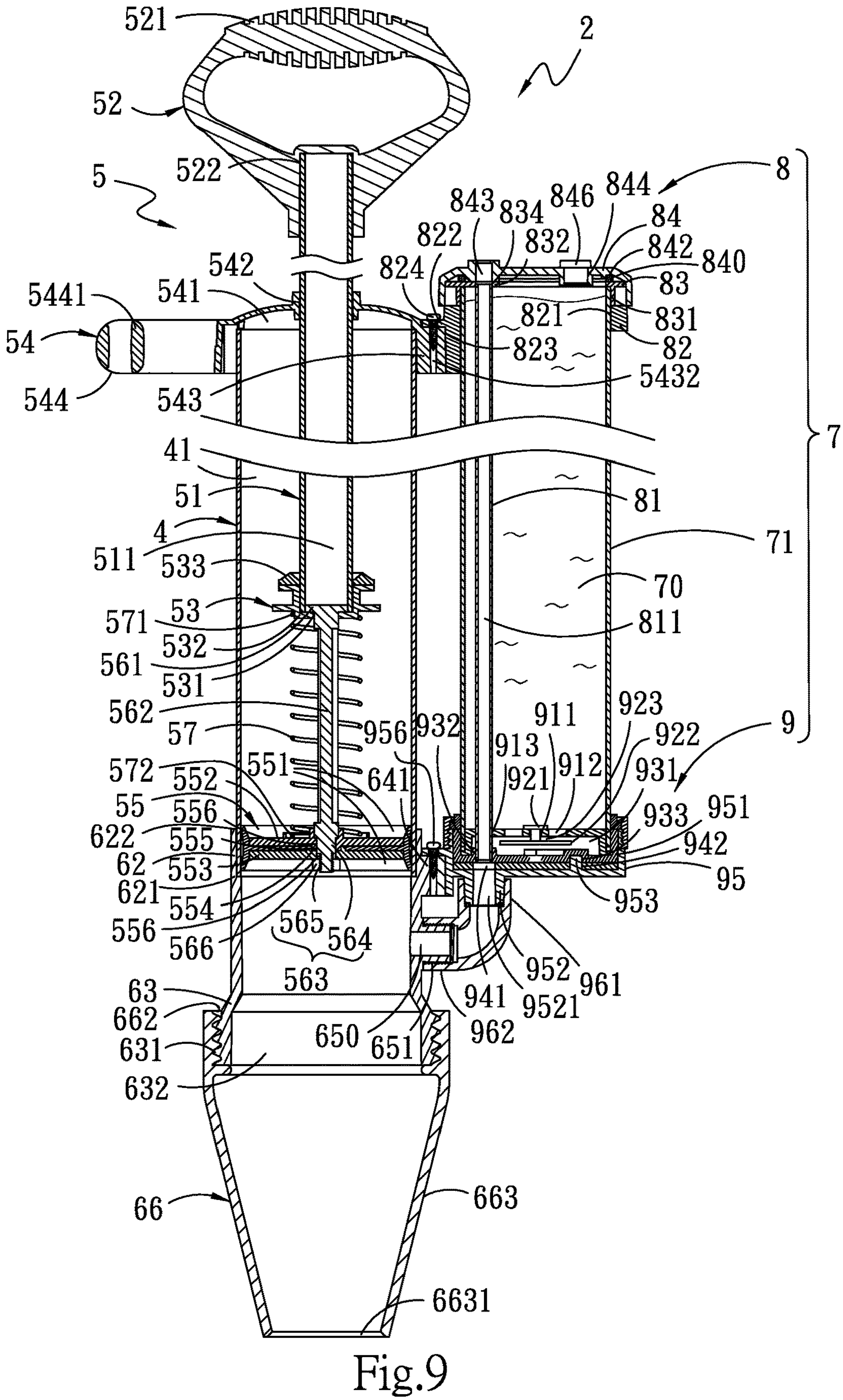
FIG. 9 is a combined sectional view of actions of covering with the upper cover and covering a ventilation hole with a plug body in FIG. 8.
Figure 11:
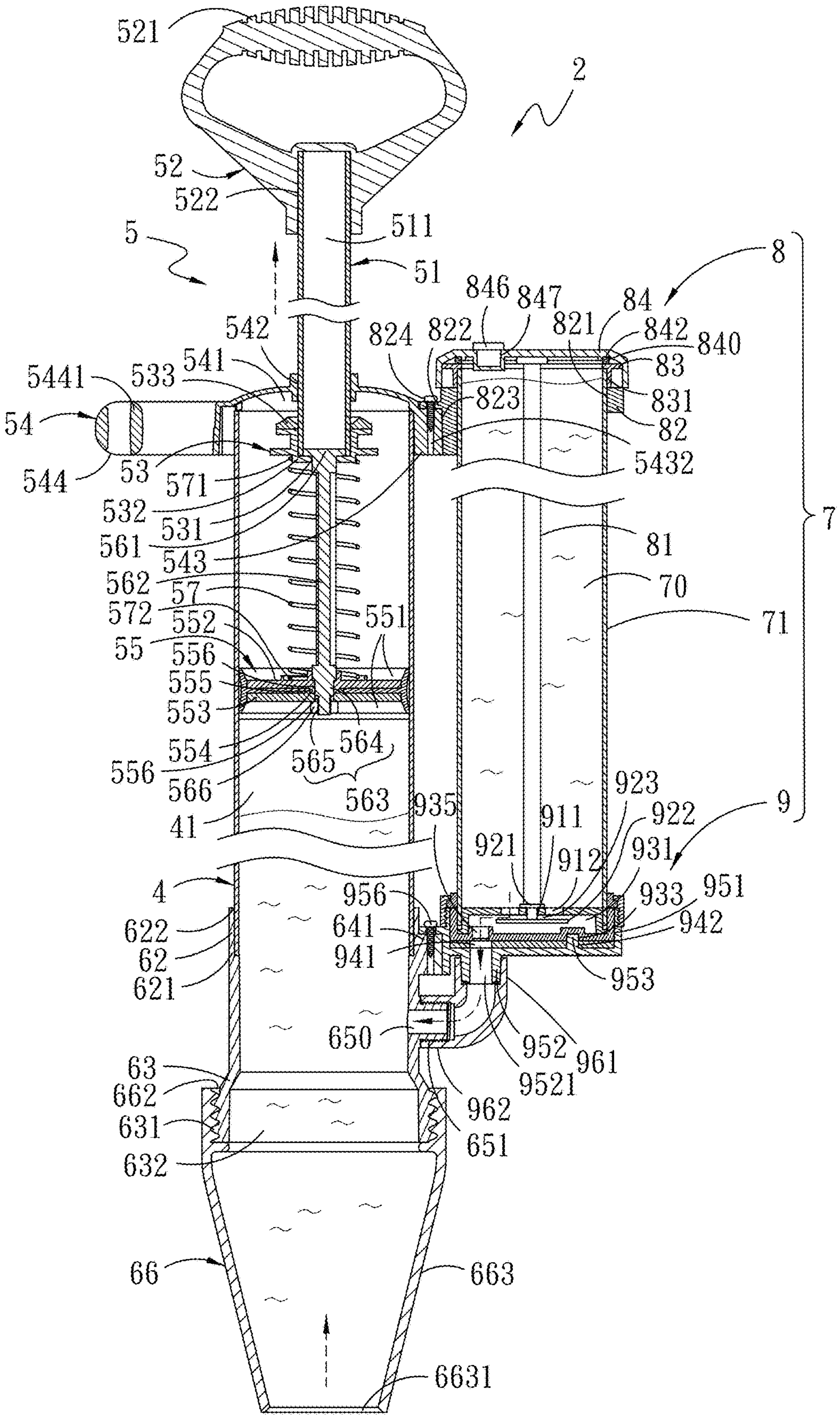
FIG. 11 is a schematic diagram of an action of water in a water replenishing pipe entering a main body pipe in FIG. 9.

Referring to FIG. 7, FIG. 8, FIG. 9, FIG. 10, FIG. 11, FIG. 12, and FIG. 13, which depict a flow chart of preparation actions of the water-replenishing pipe dredging device 2 before use when a user dredges, for example, the blockages A2 in the drainage pipeline A1 of the toilet A with the water-replenishing pipe dredging device 2 in an embodiment is provided. The user holds the upper cover 84 and rotates the water replenishing pipe 71 counterclockwise to a fixed position. At this time, the ventilation and pressure relief hole 811 is communicated with the main body pipe 4. The upper cover 84 is removed, and tap water is injected into the hollow interior 70 of the water replenishing pipe 71 until it is full (as shown in FIG. 8). Then, the upper cover 84 is returned to cover, and the plug body 846 covers the ventilation hole 844 (as shown in FIG. 9 and FIG. 10). The suction nozzle 66 in the lower part of the main body pipe 4 is placed in the drainage port A11 of the toilet A. The ventilation and pressure relief pipe body 81 will make the blocked residual water smoothly enter the main body pipe 4 and avoid the water surface from rising. To closely block the drainage port A11 of the toilet A by the suction nozzle 66 of the main body pipe 4, and to rotate the upper cover 84 clockwise to a fixed position on the other side, as shown in FIG. 11 and FIG. 12. At this time, the plurality of outlets 912 at the bottom of the water replenishing pipe 71 will be communicated with the water outlet 9521 of the lower cover seat 95, and the plug body 846 of the ventilation hole 844 will be removed from the ventilation hole 844 and put into the accommodating hole 847. The water in the water replenishing pipe 71 will smoothly enter the hollow interior 41 of the main body pipe 4 through the water outlet 9521 and the water inlet 650. Then, the handle 52 is pulled upward to a fixed position. The remaining water in the water replenishing pipe 71 will be injected into an extra space in the main body pipe 4 formed by the upward movement of the handle 52 until the water level of the main body pipe 4 is flush with that of the water replenishing pipe 71. At this time, the preparation actions of the water-replenishing pipe dredging device 2 are completed and the water-replenishing pipe dredging device 2 is available for blockage clearing impact.

Figure 13:
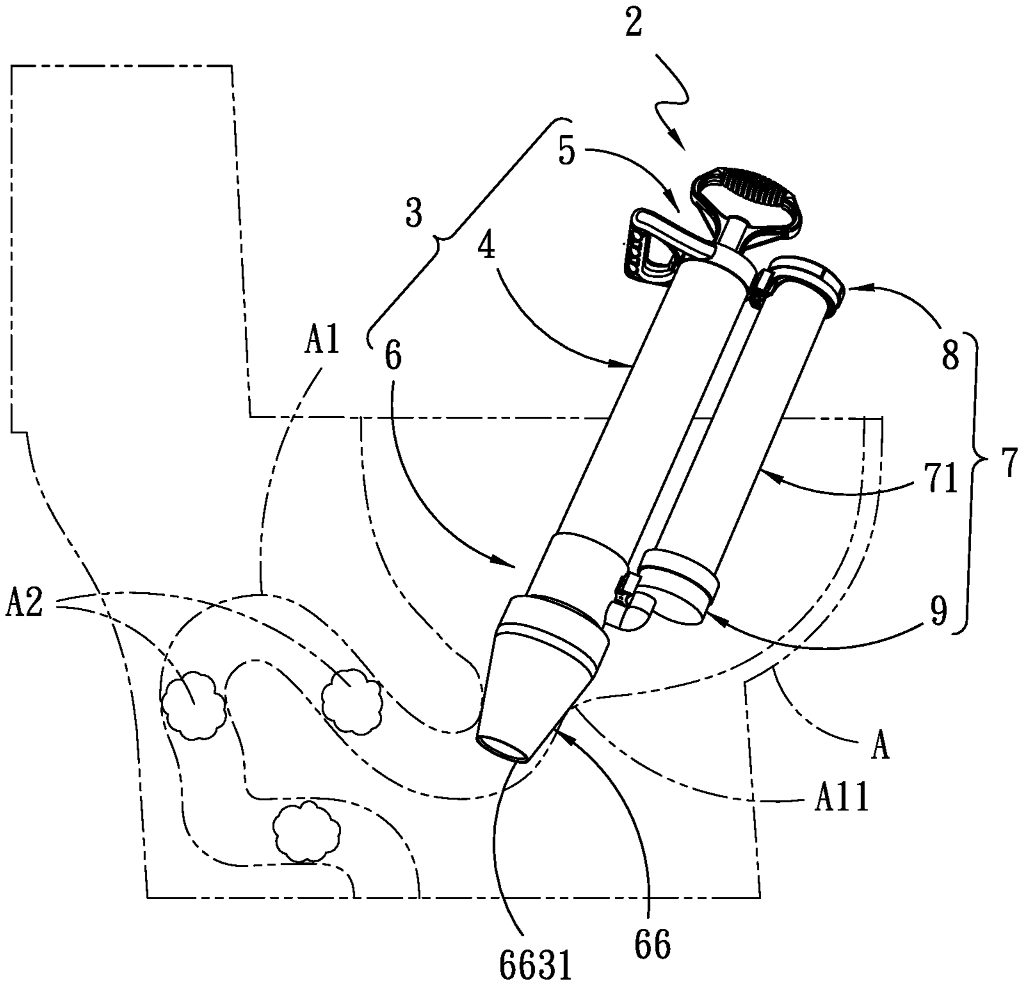
FIG. 13 is a schematic diagram of an action that the water-replenishing pipe dredging device in FIG. 3 dredges a toilet.
Figure 14:
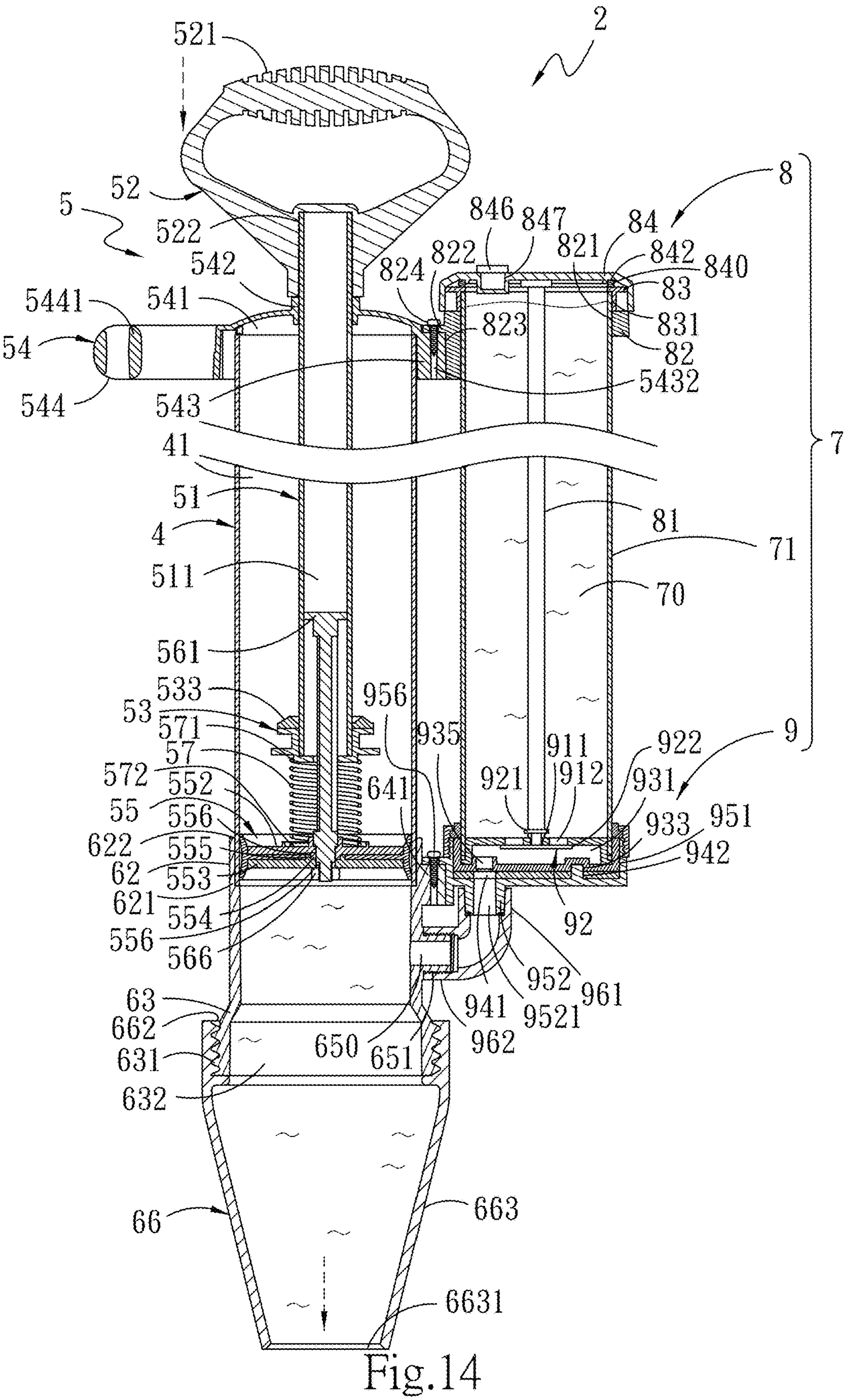
FIG. 14 is a schematic diagram of an action that the water-replenishing pipe dredging device in FIG. 13 dredges a pipe.

Referring to FIG. 13 and FIG. 14, the pipe dredging action procedure is performed after the preparation actions of the water-replenishing pipe dredging device 2 are completed. The user holds the second holding part 5441 of the horizontal grip 544 with one hand to stabilize the main body pipe 4 and slightly apply a downward pressure, and holds the first holding part 521 of the handle 52 with the other hand to apply an instant rapid pressing-down action. Thereby the push piece 53 of the handle 52 rapidly impacts the piston 55, and the impact force on the water surface in the main body pipe 4 is directly conducted to the suction nozzle 66 at the bottom of the water-replenishing pipe dredging device 2 through water, and the pressure will be conducted to a deep place where the drainage pipeline A1 of the toilet A is blocked. Because the water is an incompressible material, 100% of the impact force will be conducted to the deep place at the other end through water, and the blockages A2 will be pushed inward and downward. The distance between the blockages A2 and the drainage outlet A11 is unknown, and if the water pumped from the main body pipe 4 is not enough, the water replenishing pipe 71 will replenish water into the main body pipe 4. After the water inside the main body pipe 4 is full, the water surface is impacted through the handle 52, and some of the pressure generated by the impacted water will be diverted to the plurality of outlets 912 at the bottom of the water replenishing pipe 71. At this time, the countercurrent water pushes up the water blocker 92 to block the plurality of outlets 912, thereby preventing the backflow water pressure from being further sprayed back up. The impact action may be repeated until the blockages of the drainage pipeline A1 of the toilet A are fully cleared, or the water in the main body pipe 4 is used up by impact. At this time, in coordination with FIG. 11 and FIG. 12, if residual water is still present in the water replenishing pipe 71, the preparation actions may be repeated; and the blockages A2 in the drainage pipeline A1 of the toilet A may be cleared by continuously impacting, to achieve the dredging effect.

What is claimed is:

1. A water-replenishing pipe dredging device, comprising:
   a push-pull unit, comprising a main body pipe, a pulling part connected with a first end of the main body pipe and configured to extend and retract inside an interior of the main body pipe, and a suction part connected with a second end of the main body pipe, the second end of the main body pipe being opposite to the end of the main body to which the pulling part is connected, wherein the pulling part comprises a straight pipe body penetrating into the main body pipe, a handle arranged on an upper part of the straight pipe body and provided to drive the straight pipe body to move inside the main body pipe, a push piece arranged on a lower part of the straight pipe body, a grip cover arranged on an upper part of the main body pipe and provided for the straight pipe body to penetrate, a piston arranged inside a lower part of the main body pipe, a pull rod penetrating into the straight pipe body and the piston, and a compression spring sleeved outside the pull rod and abutted between the push piece and the piston; and wherein the grip cover comprises an accommodating space formed at a bottom of the grip cover and provided with a downward opening, and a first buckle formed on one side of an outer periphery of the grip cover, the accommodating space is sleeved on the upper part of the main body pipe, and wherein the compression spring is configured to be extended and compressed between the push piece and the piston, and wherein the suction part comprises a fixator arranged below the main body pipe and a suction nozzle assembled below the fixator, the fixator comprises a first assembling body located at an upper part of the fixator to be assembled with the lower part of the main body pipe, a second assembling body located at a lower part of the fixator which is opposite to the first assembling body, a second buckle formed on an outer periphery of the first assembling body and arranged at the same side of the main body pipe as the first buckle, and a first tubular connector formed on the outer periphery of the first assembling body and located below the second buckle, and wherein the first tubular connector is provided with a water inlet being in fluid communication with an interior of the fixator; and a water replenishing unit, provided to replenish water when the push-pull unit is implemented, wherein the water replenishing unit comprises a water replenishing pipe located on one side of the main body pipe and correspondingly clamped with the main body pipe, an upper cover group covering a top of the water replenishing pipe and clamped with the pulling part, and a lower cover group covering a bottom of the water replenishing pipe and clamped with the suction part, and wherein the upper cover group comprises a ventilation and pressure relief pipe body arranged in the water replenishing pipe and provided with a ventilation and pressure relief hole, an upper fixing body arranged on an upper part of the water replenishing pipe, an upper cover ring body arranged on an upper part of the upper fixing body, and an upper cover covering the upper cover ring body and provided for an upper part of the ventilation and pressure relief pipe body to penetrate, and wherein the upper fixing body comprises a first embedded hole for the upper part of the water replenishing pipe to penetrate, and a first buckling body formed on an outer periphery of the upper fixing body and clamped with the first buckle, and wherein the upper cover ring body comprises a second embedded hole communicated with the first embedded hole and provided for the upper part of the water replenishing pipe to penetrate, and a convex block connected with an inner periphery of the second embedded hole and provided with a first insertion hole for the ventilation and pressure relief pipe body to penetrate, and wherein the upper cover comprises a first inner sleeve hole provided for the upper cover ring body to be inserted, a second insertion hole formed on the top of the upper cover and spaced apart from the first insertion hole, and a ventilation hole formed on the top of the upper cover and spaced apart from the second insertion hole, wherein an upper part of the ventilation and pressure relief pipe extends into the second insertion hole, and a plug body configured to plug the ventilation hole is provided, wherein the lower cover group comprises an anti-backflow piece abutting an inner bottom of the water replenishing pipe and comprising a plurality of outlets, a water blocker arranged at the bottom of the anti-backflow piece and configured to uncover or cover the plurality of outlets of the anti-backflow piece so as to place the plurality of outlets in either a circulating state or a blocking state, a lower cover covering a lower part of the water replenishing pipe and moving when the water replenishing pipe rotates, a gasket arranged at the bottom of the lower cover and provided for the lower part of the ventilation and pressure relief pipe body to penetrate, a lower cover seat covering the lower cover, and a communication pipe communicating the water replenishing pipe with the main body pipe, wherein the anti-backflow piece comprises a third insertion hole corresponding to the first insertion hole and provided for the lower part of the ventilation and pressure relief pipe body to penetrate, and wherein the lower cover comprises a second inner sleeve hole provided to place the lower part of the water replenishing pipe, a fourth insertion hole formed in the lower cover and corresponding to the third insertion hole, an adjustment groove formed in the lower cover and spaced apart from the fourth insertion hole, a convex connecting cover located at the top of the lower cover, and a channel formed in the lower cover and spaced apart from the fourth insertion hole and the adjustment groove, wherein the lower part of the ventilation and pressure relief pipe body extends into the fourth insertion hole, and the convex connecting cover is provided with a third inner sleeve hole for placing the lower part of the water replenishing pipe, the bottom of the convex connecting cover abuts the top of the lower cover, and wherein the gasket comprises a fifth insertion hole and a through hole spaced apart from the fifth insertion hole, and wherein the lower cover seat comprises a fourth inner sleeve hole for placing the gasket and the lower cover, a second tubular connector located at the bottom of the lower cover seat and corresponding to the fifth insertion hole, a positioning convex grain formed at an inner bottom of the fourth inner sleeve hole and spaced apart from the second tubular connector, a second buckling body formed at the outer periphery of the lower part of the lower cover seat, located on a same side of the water replenishing unit as the first buckling body and correspondingly buckled with the second buckle, and a press-down screw cap screwed on an upper part of the lower cover seat, wherein the second tubular connector is provided with a water outlet communicated with the fourth inner sleeve hole and the ventilation and pressure relief hole, and wherein the positioning convex grain penetrates into the through hole of the gasket and the adjustment groove of the lower cover and is provided as an axial point when the lower cover is rotated, and wherein the communication pipe comprises a first connector sleeved on the second tubular connector and communicated with the water outlet, and a second connector sleeved on the first tubular connector and communicated with the water inlet, wherein the water-replenishing pipe dredging device is configured to fluid communicate the ventilation and pressure relief pipe body with the main body pipe by rotating the upper cover to a first fixed position, wherein the water-replenishing pipe dredging device is configured to fluid communicate the plurality of outlets of the anti-backflow piece with the channel and the water outlet to let water in the water replenishing pipe is capable of smoothly entering the main body pipe through the water outlet and the water inlet by rotating the upper cover to a second fixed position and removing the plug body from the ventilation hole.

2. The water-replenishing pipe dredging device according to claim 1, wherein an accommodating hole located close to the ventilation hole is formed in the upper part of the upper cover, and the accommodating hole is used for arranging the plug body.

3. The water-replenishing pipe dredging device according to claim 1, wherein the straight pipe body comprises a hollow interior, and a first holding part is arranged on an upper part of the handle, and a sleeve hole for sleeving and fixing the straight pipe body is formed in a lower part of the handle, and the push piece is an I-shaped unit, and the push piece comprises an abutting body projects from a bottom of the push piece and is provided with a first penetration hole, and a sleeving and fixing body located on the upper part of the push piece and tightly sleeved on the outer periphery of the straight pipe body, and a lower part of the straight pipe body projects through interiors of the sleeving and fixing body and the push piece, and the lower part of the straight pipe body abuts the interior of the abutting body, and the grip cover comprises a second penetration hole located on an upper part of the grip cover and communicated with the accommodating space, and a horizontal grip connected with the grip cover, the horizontal grip is arranged on a side of the grip cover opposite of the first buckle and projecting outwardly away from the grip cover, and the straight pipe body is inserted through the second penetration hole and penetrates into the sleeve hole for fixing, and the first buckle is provided with a first sleeving part and a first fixing hole located inside the first sleeving part, and the first sleeving part is concave arc-shaped, and the first fixing hole is a screw hole, and the horizontal grip is provided with a second holding part, and an upper part of the piston comprises a space, and a lower part of the piston comprises a space, wherein the space in the upper part is used for arranging an upper gasket, and the space in the lower part is used for arranging a lower gasket, and wherein a convex part is arranged at the bottom of the upper gasket, and a concave part is arranged at the top of the lower gasket and is configured to receive the convex part of the upper gasket, and the convex part of the upper gasket and the concave part of the lower gasket are each provided with a third penetration hole, and the third penetration holes are in alignment with one another, wherein the pull rod comprises a convex part, a first rod body connected with the lower part of the convex part of the pull rod and having an outer diameter smaller than that of the convex part of the pull rod, and a second rod body connected with the bottom of the first rod body, and wherein the pull rod penetrates into the hollow interior of the straight pipe body and abuts the interior of the abutting body with the convex part of the pull rod, and wherein the first rod body penetrates into the first penetration hole and is located between the abutting body and the upper gasket, and the second rod body is provided with a convex connecting rod penetrating into the third penetration holes and a screw rod arranged at the bottom of the convex connecting rod and projecting downwardly from the convex connecting rod, and wherein the screw rod is screwed and fixed at the bottom of the lower gasket through a nut.

4. The water-replenishing pipe dredging device according to claim 3, wherein the outer diameter of the convex connecting rod is smaller than that of the first rod body, and the outer diameter of the screw rod is smaller than that of the convex connecting rod.

5. The water-replenishing pipe dredging device according to claim 3, wherein the first buckling body is provided with a first clamping groove for being clamped with the first sleeving part of the first buckle, and a first fixing piece penetrates into the first buckling body and the first fixing hole of the first buckle to fix the first buckling body and the first buckle, and wherein the upper cover ring body comprises a plurality of convex blocking bodies convexly arranged on the outer periphery of the upper cover ring body, and wherein the upper cover comprises an annular groove formed at an inner bottom of the upper cover, and a plurality of notches located on the inner periphery of the upper cover and provided to clamp the convex blocking bodies, and wherein a gasket body is received within the annular groove, and the gasket body is configured to form a seal between the upper cover and the upper cover ring body.

6. The water-replenishing pipe dredging device according to claim 1, wherein the first assembling body is provided with a sleeving part comprising a first opening for assembling the lower part of the main body pipe, and the second assembling body is provided with a first locking part comprising a second opening communicated with the first opening, and wherein the first locking part comprises an external thread, and wherein the second buckle is provided with a second sleeving part and a second fixing hole located in the second sleeving part, and the second sleeving part is concave arc-shaped, and the second fixing hole is a screw hole, and the water inlet of the first tubular connector is communicated with the first opening and the second opening, and the outer periphery of the first tubular connector is provided with an external thread, and wherein the suction nozzle is assembled on the second assembling body of the fixator, and the suction nozzle comprises a second locking part having a third opening and a pipe plug part opposite to the second locking part, and wherein the second locking part comprises an internal thread, and the internal thread is correspondingly screwed with the external thread of the first locking part, and the pipe plug part is provided with a pipe port communicated with the third opening.

7. The water-replenishing pipe dredging device according to claim 6, wherein the pipe plug part is shaped as a conical body tapering from the second locking part.

8. The water-replenishing pipe dredging device according to claim 6, wherein the anti-backflow piece comprises a fixing hole located at a center of the plurality of outlets of the anti-backflow piece, and a convex wall protruding from a bottom end of the anti-backflow piece, and wherein the upper part of the convex wall is sleeved with a washer to abut the bottom of the water replenishing pipe, and wherein the water blocker comprises an abutting block axially connected to the fixing hole and protruding above the fixing hole, and a water blocking surface connected with one end of the abutting block and having an outer diameter greater than that of the abutting block, and wherein the water blocker and the anti-backflow piece are configured to form a gap between the water blocking surface of the water blocker and the anti-backflow piece, the gap is in fluid communication with the plurality of the outlets of the anti-backflow piece, and the adjustment groove is arc-shaped, and wherein the second buckling body is provided with a second clamping groove for being clamped with the second sleeving part of the second buckle, and a second fixing piece penetrates into the second buckling body and the second fixing hole of the second buckle to fix the second buckling body and the second buckle, and wherein an external thread is formed on the outer periphery of the upper part of the lower cover seat, and wherein the top of the press-down screw cap is provided with a through hole for the upper part of the convex connecting cover to penetrate and abut, and wherein an internal thread correspondingly screwed with the external thread of the lower cover seat is arranged on an inner periphery of the press-down screw cap, and the press-down screw cap is screwed down to adjust a tightness of the press-down screw cap, and wherein the communication pipe is a vertical bent pipe, and the first connector is provided with an O-ring located between the first connector and the second tubular connector and provided to make the first connector be sleeved tightly, and the inner periphery of the second connector is provided with an internal thread correspondingly screwed with the external thread of the first tubular connector.

9. The water-replenishing pipe dredging device according to claim 8, wherein the anti-backflow piece is recessed cap shape.

* * * * *